United States Patent
Sinha (10) Patent No.: US 7,422,051 B2
(45) Date of Patent: Sep. 9, 2008

(54) SYSTEM AND METHOD FOR USING A FLEXIBLE COMPOSITE SURFACE FOR PRESSURE-DROP FREE HEAT TRANSFER ENHANCEMENT AND FLOW DRAG REDUCTION

(76) Inventor: Sumon Kumar Sinha, 3607 Lyles Dr., Oxford, MS (US) 38655

( * ) Notice: Subject to any disclaimer, the term of this patent is extended or adjusted under 35 U.S.C. 154(b) by 189 days.

(21) Appl. No.: 11/489,790

(22) Filed: Jul. 19, 2006

(65) Prior Publication Data
US 2006/0254751 A1 Nov. 16, 2006

Related U.S. Application Data

(63) Continuation of application No. 10/355,346, filed on Jan. 31, 2003, now abandoned.

(51) Int. Cl.
*F28F 3/00* (2006.01)
(52) U.S. Cl. .................................... 165/80.2; 244/35 R
(58) Field of Classification Search ................ 165/80.2, 165/80.3, 166; 244/35 R
See application file for complete search history.

(56) References Cited

U.S. PATENT DOCUMENTS

| | | | |
|---|---|---|---|
| 2,596,642 A * | 5/1952 | Boestad ...................... 165/166 |
| 4,003,155 A | 1/1977 | Raskin | |
| 4,647,063 A | 3/1987 | Pringer et al. | |
| 5,395,071 A * | 3/1995 | Felix ......................... 244/35 R |
| 5,876,564 A * | 3/1999 | Aidun ........................ 162/216 |
| 5,961,080 A | 10/1999 | Sinha | |
| 6,092,990 A | 7/2000 | Hassan et al. | |
| 6,109,566 A | 8/2000 | Miller et al. | |
| 6,425,984 B2 * | 7/2002 | Aidun ........................ 162/343 |
| 6,516,652 B1 * | 2/2003 | May et al. ...................... 73/10 |
| 6,610,175 B2 * | 8/2003 | Aidun ........................ 162/336 |
| 6,673,136 B2 | 1/2004 | Gillingham et al. | |

* cited by examiner

*Primary Examiner*—Ljiljana (Lil) V Ciric
(74) *Attorney, Agent, or Firm*—Sawyer Law Group, LLP (57) ABSTRACT

A flexible composite sheet (FCS) comprising a membrane, a substrate coupled to the membrane, and a plurality of ridges coupled between the membrane and the substrate, wherein a vibratory motion is induced from the flow to at least one segment of membrane spanning a distances, wherein a favorable pressure gradient aids the flow and an adverse pressure gradient opposes the flow; wherein the vibratory motion is reflected from at least one segment of the membrane to the flow, and wherein a reduction in fluctuations is caused in the flow pressure gradient and freestream velocity U except where the frequency is approximately equal to =U/s. The FCS has other flow control applications, such as a drag reduction when coupled to an aircraft wing.

5 Claims, 9 Drawing Sheets

SYSTEM AND METHOD FOR USING A
FLEXIBLE COMPOSITE SURFACE FOR
PRESSURE-DROP FREE HEAT TRANSFER
ENHANCEMENT AND FLOW DRAG
REDUCTION

CROSS-REFERENCE TO RELATED APPLICATION

This application is a continuation application of application Ser. No. 10/355,346, filed Jan. 31, 2003 now abandoned, entitled "System and Method for Using a Flexible Composite Surface for Pressure-Drop Free Heat Transfer Enhancement and Flow Drag Reduction."

FIELD OF THE INVENTION

The present invention relates to a passive flow-control method for customizing turbulent flow fluctuations, and more particularly to a flexible composite surface for achieving this and resulting in enhancing heat transfer in heat exchanger passages while minimizing the drop in flow pressure, and reducing fluid flow induced drag.

BACKGROUND OF THE INVENTION

Heat exchangers are used for transferring heat in a variety of systems such as those for manufacturing, heating ventilating and air-conditioning, power generation, and electronic packaging. One goal in the design of a heat exchanger is to maximize the convective heat transfer between a working fluid and a solid wall. One way to do this is by increasing the velocity of the fluid, which enhances the wall convective heat transfer coefficient. However, as per the estimates of Kays and London (1984), while the heat transfer coefficient is directly proportional to the velocity, the power required to drive the flow is proportional to the square of the velocity. This imposes an upper limit on the maximum allowable velocities in the heat exchanger.

Most compact heat exchangers employ closely spaced fins or similar structures to augment the heat transfer area for a given device volume. Additional augmentation requires modifying the wall boundary layer flow, usually with the help of turbulence promoters, such as baffles or wall roughness elements. This is generally necessary for heat exchange from air streams due to significantly lower heat capacities and thermal conductivities of air compared to water or other commonly used liquid heat transfer media.

The principal problem of this solution is that using such turbulence promoters causes a significant drop in flow pressure, thereby increasing the power consumption of the fans. A second drawback is that turbulence promoters often snag solid particles or debris, thereby increasing flow blockage and heat transfer surface fouling in many instances.

Generally, there is not a good solution to these problems. Accordingly, what is needed is a system and method for increasing heat transfer while minimizing, or eliminating the additional flow pressure drop. The present invention addresses such a need.

SUMMARY OF THE INVENTION

A flexible composite sheet is disclosed. The flexible composite sheet comprising a membrane, a substrate coupled to the membrane, and a plurality of ridges coupled between the membrane and the substrate, wherein a vibratory motion is induced from the flow to at least one segment of a membrane spanning a distances, wherein the vibratory motion is reflected from at least one segment of the membrane to the flow, and; wherein a reduction in fluctuations is caused in the flow pressure gradient and freestream velocity U at all frequencies except around f, where f≈U/s.

In one embodiment, the flexible composite sheet can be wrapped around a blunt leading edge of a plate facing an incoming flow of fluid. In another embodiment, the flexible composite sheet can also be wrapped around one or more regions of an aerodynamic surface where a flow pressure gradient changes from favorable to adverse. In another embodiment, the flexible composite sheet is replaced with a plurality of plates coupled to a substrate, wherein the plurality of plates has edges that interact with a fluid flow similar to a compliant surface.

DETAILED DESCRIPTION

The present invention relates to heat exchangers, and more particularly to a flexible composite surface for enhancing heat transfer in heat exchanger passages while minimizing the drop in flow pressure. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Generally, a system and method in accordance with the present invention enhances the transfer of heat in heat exchangers by utilizing a flexible composite surface (FCS). The FCS includes a membrane coupled to a substrate and a plurality of ridges coupled between the membrane and the substrate. Vibratory motion from a flow pressure gradient fluctuation is applied to at least one segment of the membrane. The membrane reflects the vibratory motion from the at least one of its segments to the flow pressure gradient fluctuation. This sustains fluctuations in the flow pressure gradient only around a pre-selected frequency. This helps sustain a thin layer of re-circulating fluid downstream of the FCS over the solid surface, which exchanges heat with the flow. This thin layer allows efficient heat transfer from the solid surface to the flowing fluid without introducing high frictional forces between the fluid and the wall. This allows heat transfer without increasing the pressure drop in the fluid flow passage. To more particularly describe the features of the present invention, refer now to the following description in conjunction with the accompanying figures.

Figure 1:
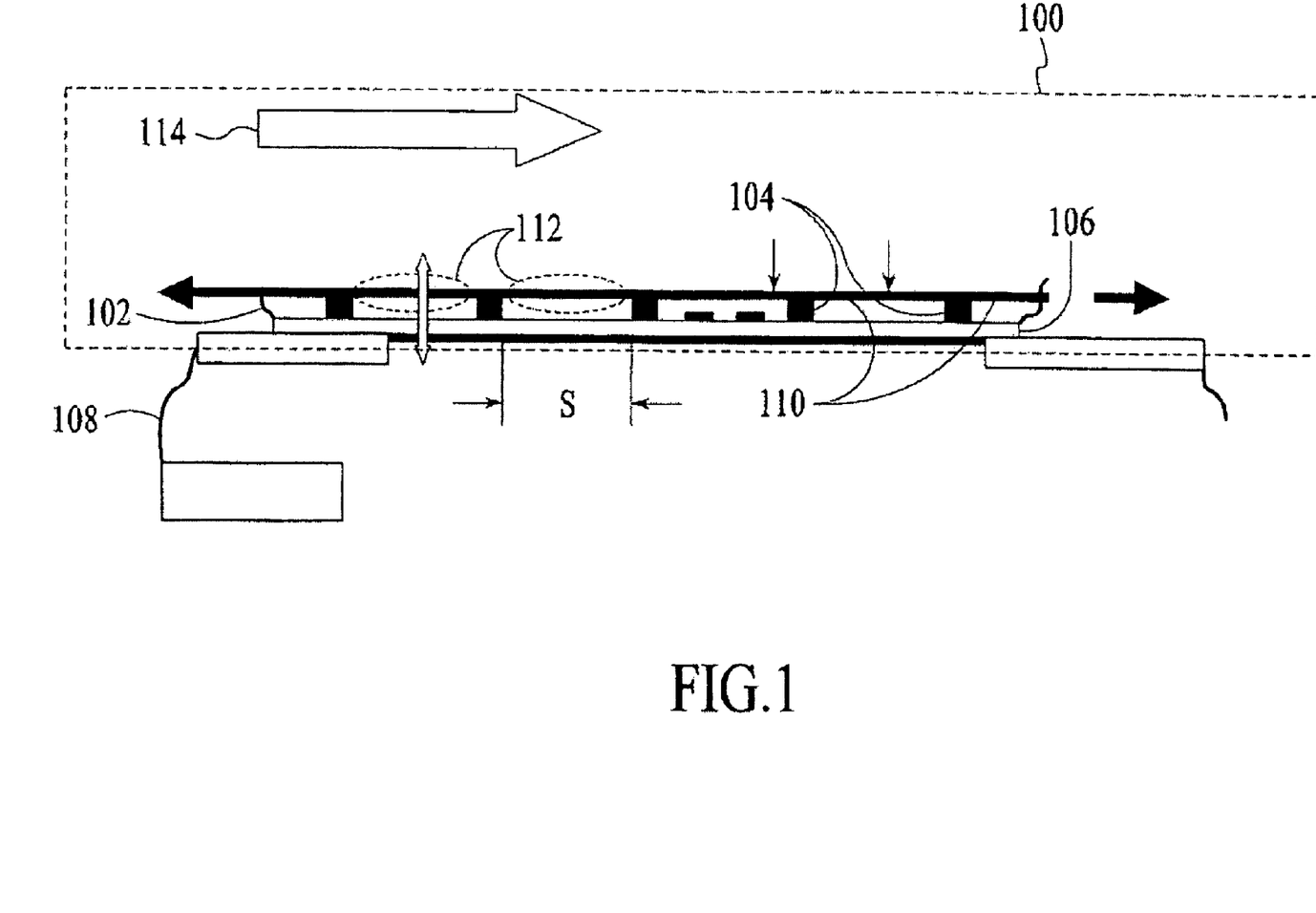
FIG. 1 is a diagram of a flexible composite surface (FCS) in accordance with the present invention.

FIG. 1 is a diagram of a flexible composite surface (FCS) 100 in accordance with the present invention. The FCS 100 is also referred to as the SINHA-FCS 100. The FCS includes a flexible membrane 102, which is stretched across an array of strips or ridges 104. The ridges 104 are coupled to a substrate 106. The FCS 100 can be coupled to an aerodynamic body. In this specific embodiment, the FCS 100 is coupled to a surface of a wing 108. Also, the membrane 102 is thinner (e.g., 6 um) than the substrate base (e.g., 50-100 um).

The membrane 102, the ridges 104, and the substrate 106 form air pockets 110 that contribute towards the stiffness and damping governing flexural vibratory motion 112 of the membrane 102. The flexural vibratory motion 112 is caused by the flow 114 of a fluid along the membrane 102.

The natural frequency of the flexural vibratory motion 112 can be tuned as desired by varying the spacing S between the ridges 104, the size (e.g., thickness) of the air pockets, the tension of the membrane 102, as well as the density and elastic modulus of the membrane material (Sinha et al, 1999). The damping of the membrane 102 can be made to vary with frequency and flexural mode by segmenting the air pockets 110 with suitably located shorter ridges. The narrow gap above a short ridge provides an increased resistance to airflow across it. Thus, all flexural modes of the membrane requiring such flows in the substrate have larger damping in comparison to modes that do not. One benefit of the FCS 100 is that it controls the frequency and flexural mode passively, i.e., non-powered.

As will is illustrated in more detail below, the mechanics of the interaction between the FCS 100 and the flow 114 stems from the flow 114 imparting motion to the membrane 102 and vice versa. Even though the full details of such interaction are extremely complex, certain dominant interaction modes can be extracted by properly tailoring the mechanical properties of the membrane 102 in relationship to key features of the flow 114, such as the pressure gradient.

The FCS 100 exploits such a dominant interaction mode for manipulating a varying and adverse-pressure gradient (APG) boundary layer flow. APG flows are those where the imposed pressure tends to oppose the flow. In many instances, this leads to boundary layer flow separation, resulting in large increases in turbulence and flow losses. The present invention decreases the boundary layer flow separation and thus decreases overall turbulence and flow losses. As a result of such manipulation, any turbulence in the flow 114 is controlled and the transfer of momentum, heat, and mass across the APG boundary layer can be decoupled and changed to obtain desired outcomes.

Almost all turbulent frequencies can be controlled or eliminated. Also, a small selected frequency band can be amplified, thereby customizing the spectrum of the turbulent fluctuations. Such a selective modification of the turbulent spectrum is another benefit of the embodiments of the present invention. Another benefit is that the FCS can interact with an inflectional velocity profile downstream of the point of flexible-wall interaction.

Figure 2:
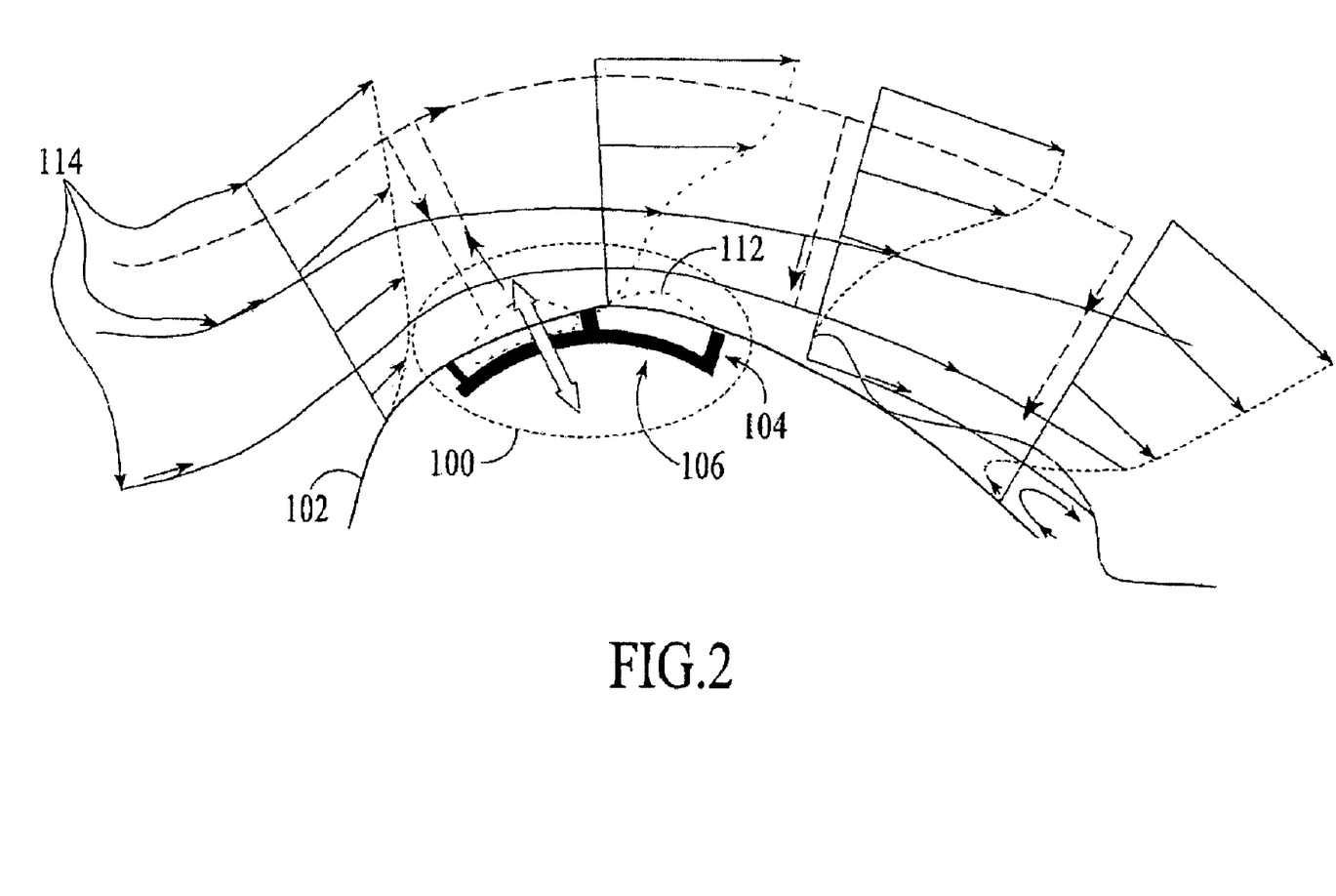
FIG. 2 is a diagram of a portion of the FCS of FIG. 1 interacting with a flow of fluid in accordance with the present invention.

FIG. 2 is a diagram of a portion of the FCS 100 of FIG. 1 interacting with a flow 114 of fluid in accordance with the present invention. The FCS 100 can be located over regions of an aerodynamic surface where the flow pressure gradient changes from favorable to adverse. Under such flow conditions, flow induced pressure fluctuations can impart flexural vibratory motion 112 to segments of the membrane 102 between adjacent ridges 104. The flexural vibratory motion 112 of the membrane segments, in turn, can impart pressure fluctuations to the flow 114 at the vibrating frequencies. This interaction constrains the pressure fluctuations and the resulting flow velocity fluctuations around a frequency f≈U/s (where, U=the freestream velocity above the membrane and s=the distance between adjacent high ridges on the substrate), as long as f does not coincide with the fundamental flexural natural frequency of the vibrating membrane segment.

The exposed surface of the membrane 102 creates a non-zero wall velocity condition for the boundary layer flow at locations where the flow 114 is receptive to this condition. The interaction of the flow 114 with the flexural vibratory motion 112 of the compliant membrane 102 results in the flow 114 being forced to a new equilibrium.

The following description elucidates details crucial towards exploiting this interaction. The streamwise u-momentum equation of the flow 114 at the mean equilibrium position (y=0) of the surface of the membrane 102 of the FCS 100 is considered first:

$$v(\partial u/\partial y)y=0 = -(1/\rho)(\partial p/\partial x) + (\mu/\rho)(\partial 2u/\partial y2)y=0 \quad (1)$$

The streamwise x-component of velocity "u" of the vibrating membrane 102 (or the velocity of the fluid at the points of contact with the membrane 102) has been assumed to be negligible, while the wall-normal y-component of velocity "v" of the fluid next to the membrane 102 is clearly non-zero due to membrane compliance. Key to flow-membrane interaction is the realization that the wall-normal gradient of the streamwise velocity at the wall, $(\partial u/\partial y)y=0$, can be extremely large at certain x-locations. At such locations, even a small oscillation velocity (v<<U) of the flexible membrane can make the $v(\partial u/\partial y)y=0$ "control" term on the left hand side of equation (1) predominant. For a non-porous, non-compliant wall, this control term is identically zero. Additionally, if the boundary layer velocity profile at the aforementioned locations is such that prior to interaction $(\partial u^2/\partial y^2)$ y=0≈0, while $|(\partial u/\partial y)y=0|>0$, (i.e., u(y) is approximately linear near the wall) an order of magnitude balance of the terms in equation (1) yields:

$$v(\partial u/\partial y)y=0 \approx -(1/\rho)(\partial p/\partial x) \quad (1\text{-a})$$

Such a condition can be satisfied in boundary layers over curved surfaces, in the vicinity of x-locations where the streamwise pressure gradient ∂p/∂x changes from favorable (∂p/∂x<0) to adverse (∂p/∂x>0), as shown in FIGS. 1 and 2.

What makes such locations unique is the large relative change in ∂p/∂x introduced through equation (1-a), since ∂p/∂x≈0 prior to this interaction.

For boundary layer flows, pressure variation across the boundary layer (∂p/∂y) is negligible, and the streamwise pressure gradient ∂p/∂x can be obtained from the inviscid momentum equation at the outer, or freestream edge of the boundary layer:

$$(\partial U/\partial t)+U(\partial U/\partial x)=-(1/\rho)(\partial p/\partial x) \quad (2)$$

For x-locations where equation (1-a) holds, an oscillatory motion of the wall can, therefore, directly introduce fluctuations in the freestream velocity U, through the pressure gradient term. For example, in a steady boundary layer flow over a rigid non-porous wall, the pressure gradient term on the right hand side of equation (2) will be completely balanced by the non-linear convective term $[U(\partial U/\partial x)]$ on the left hand side. If this flow is perturbed, by introducing a small wall-normal velocity v through flexible wall motion, the resulting fluctuations in the pressure gradient will have to be balanced by the unsteady term $(\partial U/\partial t)$ in equation (2). For x-locations where ∂p/∂x≈0 in the unmodified flow, as required for ensuring the validity of equation (1-a), the overall effect of wall motion can be expressed as:

$$\partial U/\partial t \approx v(\partial u/\partial y)y=0 \quad (3)$$

It is important to note that equation (3) holds irrespective of the source of the perturbations. The discussions thus far have presumed the source to the flexible wall (Sinha, 2001). However, equation (3) also describes how fluctuations in the freestream velocity U can impart oscillations to a compliant wall at x-locations where equation (1-a) remains valid (Sinha and Zou, 2000). If fluctuations exist in the freestream velocity U, as is normally the case in most external aerodynamic flows, the presence of a compliant wall around the ∂p/∂x≈0 location results in partitioning the energy of the fluctuations between the fluid and the wall (Carpenter et al, 2001). The degree of partitioning at any instant depends on the temporal phase of the wall oscillation cycle.

The vibratory response of the wall also plays a key role in this interaction. The predominant response of the FCS 100 can be expected to be flexural. The maximum displacements and energy storage capacity of the FCS 100 corresponds to the fundamental mode as per the sketch of the deflected membrane in FIGS. 1 and 2. Dissipation can also be expected to be higher for higher modes of flexural vibratory motion, especially if the low ridges constrict the airflow across them.

The combined flow-wall interaction proceeds as follows: As a mass of disturbed freestream fluid approaches a segment of the membrane 102, where equation (1-a) holds, the membrane 102 begins to undergo flexural displacement. The membrane 102 continues to deflect as the disturbed fluid convects over it. At some point the displaced membrane 102 begins to swing back, initiating the reverse phase of the oscillation cycle. In the process of deflecting to its extreme position, the membrane 102 and substrate 106 of the FCS 100 store a significant portion of the flow fluctuation kinetic energy as elastic potential energy. As the membrane 102 springs back, most of this energy is released back to the flow 114. However, the original fluid particles, which had provided this energy, would have convected downstream by a distance U.Δt during the time interval Δt taken by the membrane 102 to execute one oscillation cycle. For the re-released energy to be imparted to the same mass of fluid that originated it, the following condition must hold:

$$U \cdot \Delta t = s \quad (4)$$

where, s=the free length of the membrane of the FCS 100, between two ridges. This condition imposes the membrane oscillation frequency: f=U/s. The aforementioned process results in amplifying fluctuations corresponding to f, while attenuating fluctuations at other frequencies. The efficacy of the selection process depends on the ability of the FCS to damp out higher modes, while minimizing damping in the fundamental flexural mode. Also, the spacing s has to be sufficiently close such that equations (1-a) and (3) hold throughout this region. The frequency selection criterion and the conditions needed for small amplitude wall motion to influence the freestream also hold for externally actuated active flexible wall transducers (Sinha, 1999 and Sinha, 2001). The validity of equation (3) has been experimentally verified by noting the fact that electrically driven flexible wall motion at a frequency f=U/s produced large fluctuations in the freestream velocity U at the same frequency while attenuating fluctuations at other frequencies (Sinha, 2001).

The net effect of the aforementioned selection process is to concentrate velocity and pressure fluctuations at a frequency f≈U/s. Also, these fluctuations convect downstream to the point where the boundary layer begins to separate. At the separation point, equation (1) simplifies to:

$$0=-(1/\rho)(\partial p/\partial x)+(\mu/\rho)(\partial 2u/\partial y2)y=0 \quad (5)$$

This implies that fluctuations in ∂p/∂x directly contribute towards introducing a vorticity flux $\partial\Omega/\partial y=\partial(\partial u/\partial y)/\partial y$ through the viscous term in equation (5). Also, equations (1-a) and (3) hold on the centerline of the separated shear layer, immediately downstream of the separation point. The final effect is to utilize sustained fluctuations in the freestream velocity U to impart wall-normal oscillations at a predetermined frequency U/s to the separated shear layer, thereby encouraging rapid entrainment of the surrounding fluid through wave breaking. Increased entrainment from the separated region near the wall reduces the pressure in this region and forces the separated shear layer closer to the wall. This results in reattachment of the flow.

Compared to the unmodified flow, the FCS 100 constrains turbulent fluctuations to a narrower band. This "customized turbulence" can be expected to be less dissipative. The fundamental natural frequency for flexural vibratory motions 112 of the membrane 102 has no bearing on the flow-membrane interaction frequency f, as long as they are sufficiently apart. If the two coincide, the amplitude of the oscillating membrane 102 increases, thereby enhancing non-linear dynamic effects. This can trigger other modes of oscillation of the membrane 102, thereby increasing energy losses and broadening the spectrum of flow fluctuations. The FCS 100 then begins to behave as a broad-spectrum turbulator, promoting much larger losses through rapid buildup of turbulent skin friction.

One of the features of the FCS 100 is control of boundary layer flows in general, including applications to aircraft wings. The FCS 100 can be applied to an aircraft wing to achieve drag reduction. In order to ascertain the feasibility of using the FCS 100 to reduce wing drag flight tests were conducted with an FCS tape (with 0.4 mm-wide high strips with spacing s=0.8 mm and a single 15-µm lower low strip in the center of each pair of high strips) mounted at about 65-75% of a chord from a leading edge on the top (suction) and bottom (pressure) surfaces of an advanced 1.24-m chord.

Figure 3:
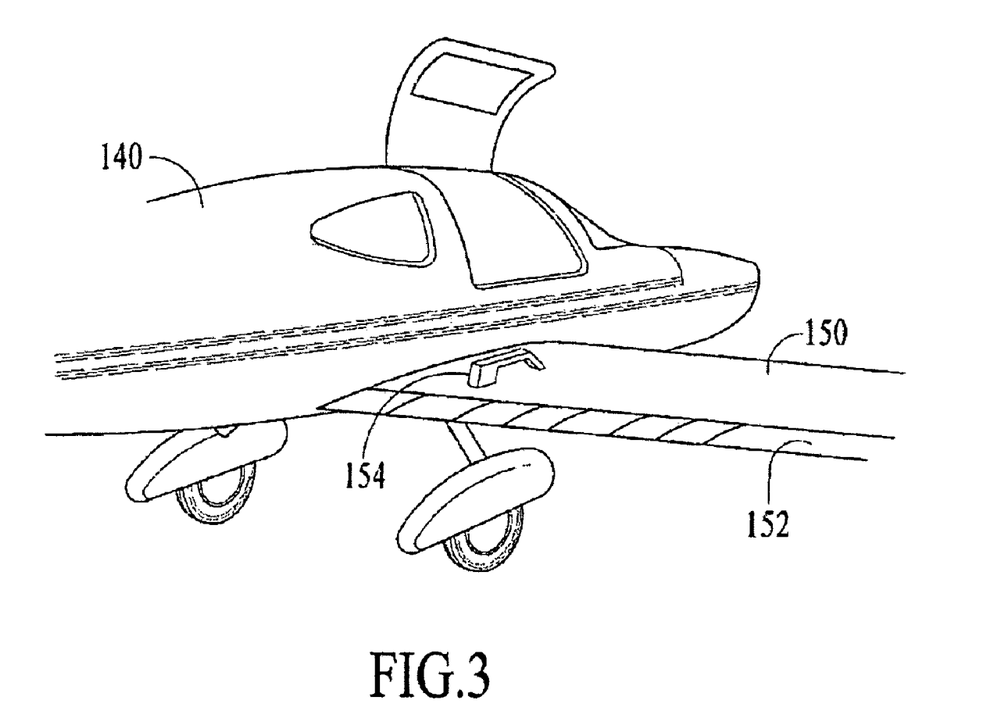
FIG. 3 shows a photograph of a Global-GT3 test aircraft.

FIG. 3 shows a photograph of a Global-GT3 test aircraft 140 (manufactured by Global Aircraft Inc., Starkville, Miss.), which is instrumented for wing-bottom measurements. The aircraft 140 has a wing 150, which is used for the wing drag flight tests. The wing 150 has a starboard flap 152. Pressure transducer array 154 is mounted on top of the wing 150.

Figure 4:
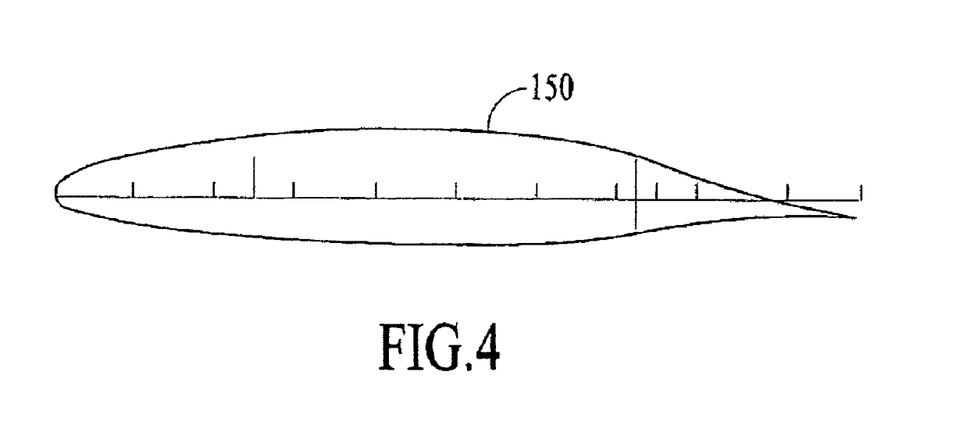
FIG. 4 is a diagram showing the cross-section of the wing of FIG. 3.

FIG. 4 is a diagram showing the cross-section of the wing 150 of FIG. 3. In this specific embodiment, the wing 150 is an NLF-0414F natural laminar-flow airfoil wing. The flow pressure gradient changes from slightly favorable to adverse around 65-75% of the chord on both the top (suction) and bottom (pressure) surfaces of this airfoil.

Figure 5:
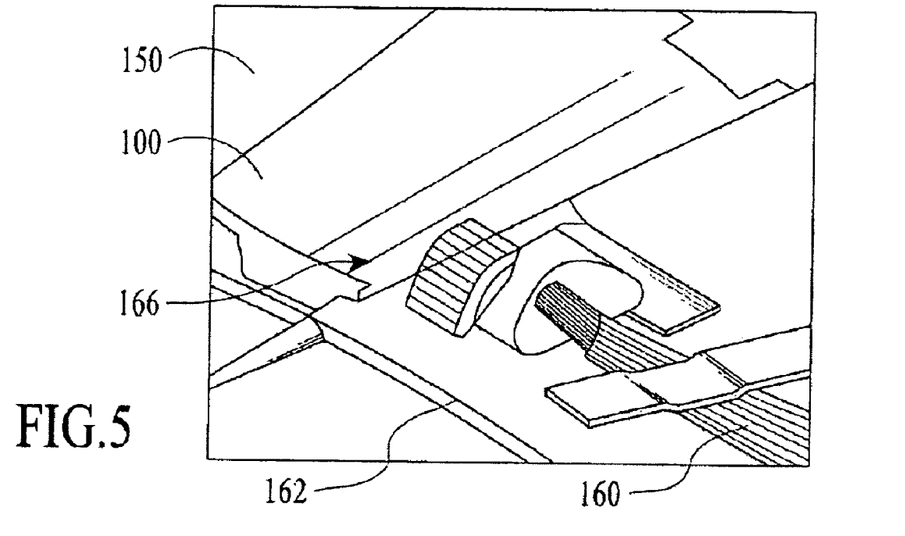
FIG. 5 shows a photograph of an FCS mounted on the bottom of the wing of FIG. 3.

FIG. 5 shows a photograph of a SINHA-FCS 100 mounted on the bottom of the wing 150 of FIG. 3, along with the boundary layer mouse 160 used to measure boundary layer velocity profiles. This arrangement is just below the outboard end of the taped section of the starboard flap 152 of FIG. 3. In this specific application, the FCS 100 is a 300-mm spanwise and 50-mm chordwise section. A wing-flap joint 162 runs over the mouse 160. The leading edge of mouse tubes 166 are immediately upstream of the wing-flap joint 164 at x/c=0.8.

During the test, the aircraft was flown at about 3000 ft pressure altitude at its level cruising speed of 106-kt. This corresponded to Rec≅4.8×106, flight Mach number M≅0.22 and a section angle of attack α≅−1°. Several sets of data were acquired both for the clean airplane without the FCS 100, as well as with the FCS 100.

Figure 6:
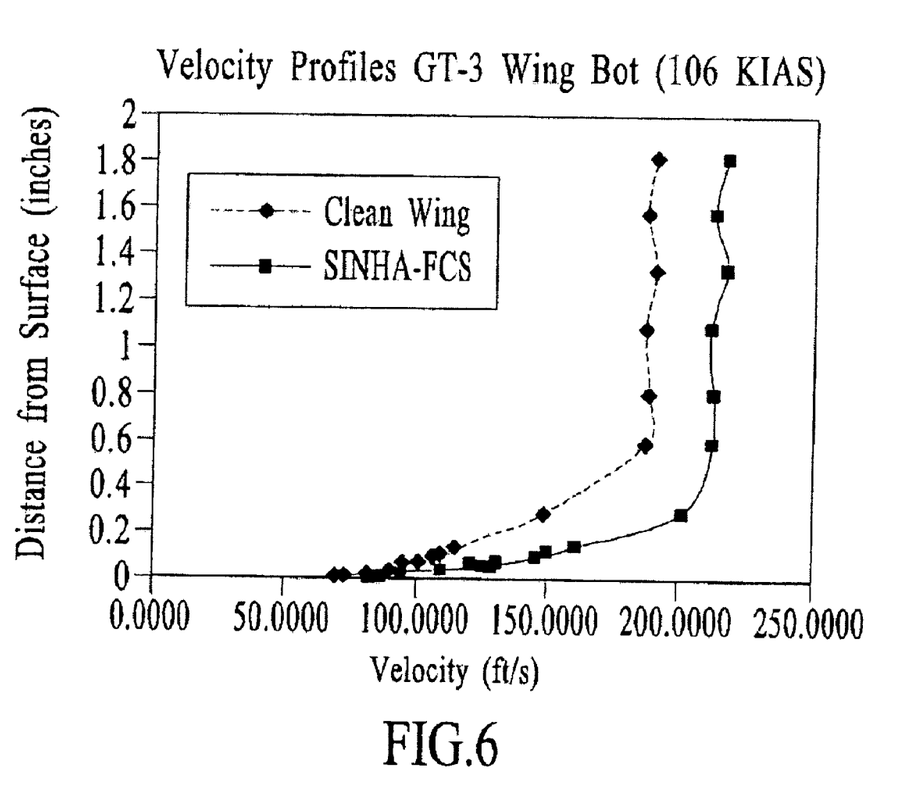
FIG. 6 is a chart showing measured pressure-side boundary-layer velocity profiles at 80% of chord from the leading edge, with and without the FCS.

FIG. 6 is a chart showing measured pressure-side boundary-layer velocity profiles at 80% of chord from the leading edge, with and without the SINHA-FCS. Integrating the velocity profiles shows the drag resulting from the marginal separation induced wake momentum defect as: Fractional reduction in drag=[∫ρu2dy|with FCS−∫ρu2dy|clean wing]/∫ρu2dy|clean wing. The data in FIG. 6 showed that the FCS reduced the drag under level cruise conditions by about 25%.

A significant increase in the freestream velocity is also seen due to the FCS. This could not be attributed to measurement uncertainties. The FCS, therefore, also helps speed up the flow outside the viscous dominated boundary layer. As expected for a lifting wing, at x/c=0.8, the freestream velocities on the suction side are higher than those on the pressure side. However the difference is smaller for the data with the FCS. Hence, it is possible for the FCS to influence CL as well.

Figure 7:
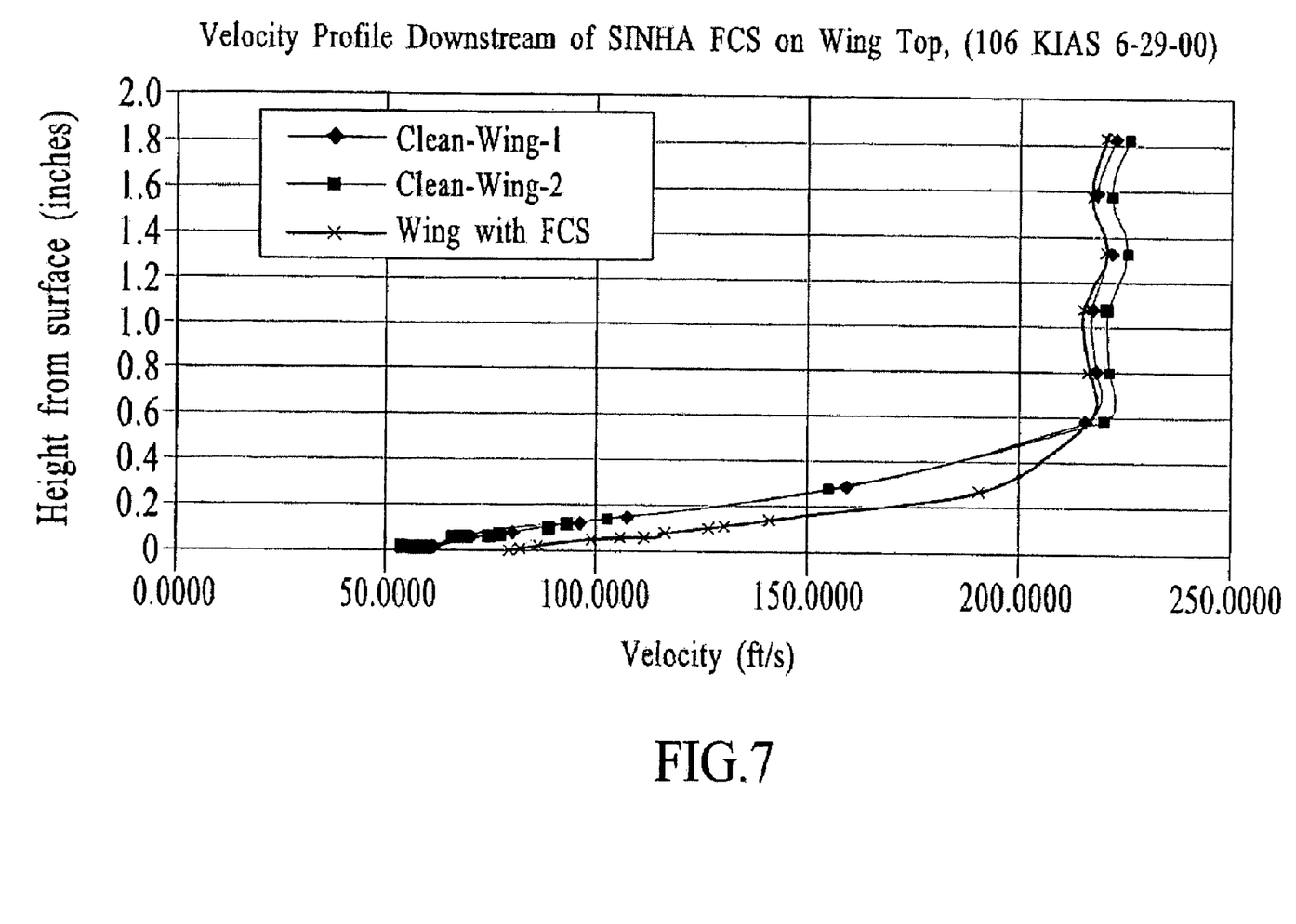
FIG. 7 is a chart showing measured suction-side boundary-layer velocity profiles, with and without the FCS at 80% of chord from the leading edge.

FIG. 7 is a chart showing measured suction-side boundary-layer velocity profiles, with and without the SINHA-FCS at 80% of chord from the leading edge. The difference between Clean-Wing-1 and Clean-Wing-2 profiles shows test uncertainties. FIG. 7 shows a similar behavior for the suction side of the wing, resulting in 18-20% reduction in drag. The two "Clean-Wing" profiles, corresponding to the extreme values of the measured velocity profiles, provide a visual indication of uncertainties in the acquired data due to unavoidable atmospheric turbulence. Based on the aforementioned estimates from this data, approximately 20% reduction in wing drag can be expected for the section of the wing influenced by the FCS if it is affixed to both top and bottom surfaces.

The data of FIGS. 6 and 7 were obtained by affixing the FCS strip first to the pressure side only and then to the suction side only. If the FCS were applied to cover substantial spanwise locations on both surfaces, the wing angle of attack and the throttle setting would probably have to be changed to maintain the constant 106-kt airspeed.

Figure 8:
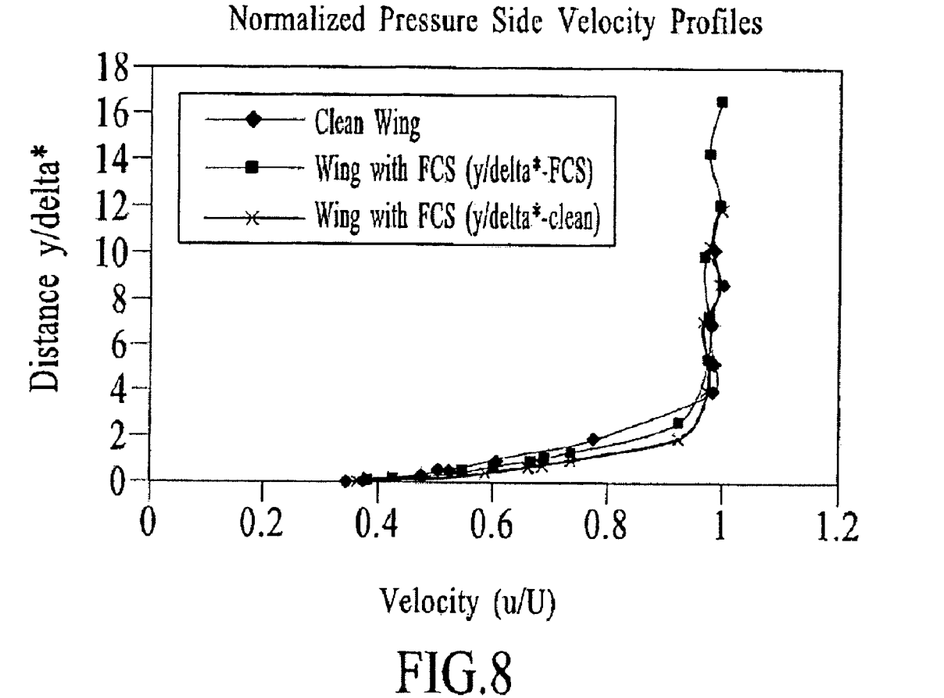
FIG. 8 is a chart showing plots of the pressure-side velocity data of FIG. 6 normalized with respect to the measured velocities furthest away from the wall.

FIG. 8 is a chart showing plots of the pressure-side velocity data of FIG. 6 normalized with respect to the measured velocities furthest away from the wall. The profiles for the wing with FCS are normalized with respect to δ* values before and after FCS application. This isolates the change in the shape of the velocity profile. FIG. 8 demonstrates that applying the FCS on the bottom surface reduces the shape factor H (H=displacement thickness δ*/momentum thicknessθ) from 1.46 to 1.35, thereby making it fuller.

Figure 9:
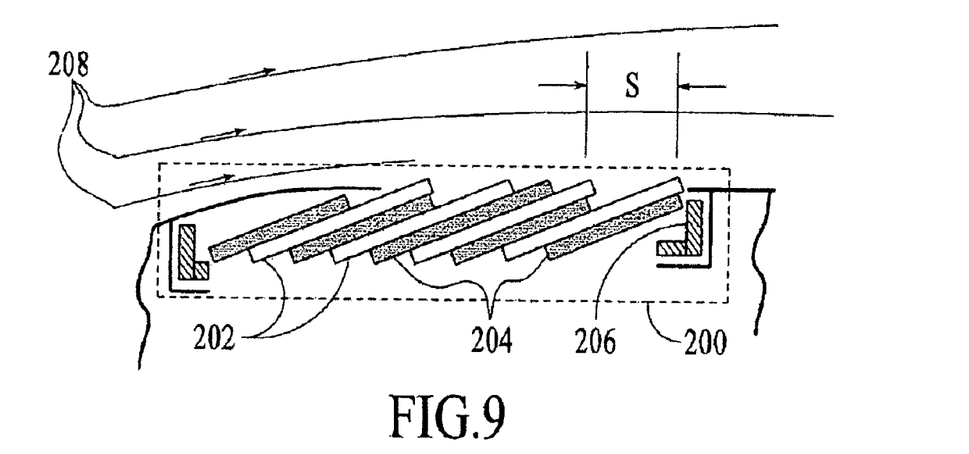
FIG. 9 is a diagram of an FCS interacting with a flow of fluid in accordance with another embodiment of the present invention.

FIG. 9 is a diagram of an FCS 200 interacting with a flow of fluid in accordance with an embodiment of the present invention. This embodiment consists of thin plates 202 staggered at a shallow angle and sandwiched between compliant porous elastomeric layers 204 having visco-elastic properties. This assembly is imbedded in a substrate 206, which can be affixed to a body over which an adverse-pressure-gradient flow 208 takes place.

Figure 10:
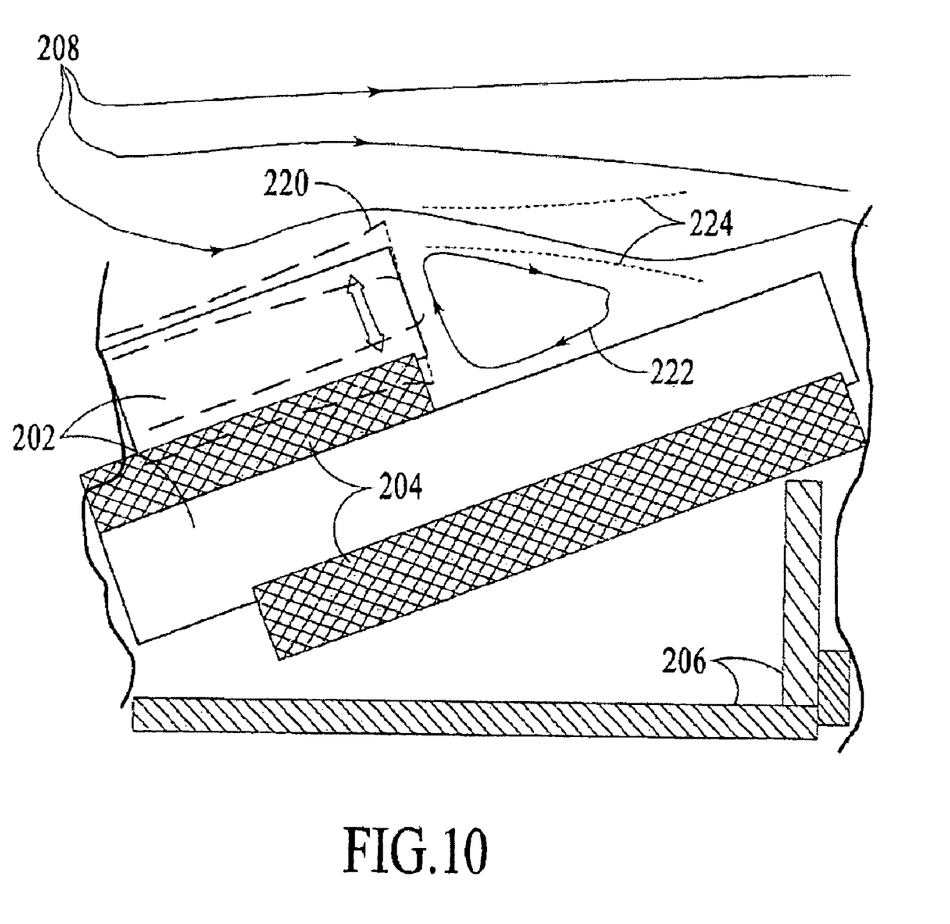
FIG. 10 is a blow-up diagram of a portion of the FCS of FIG. 9 interacting with a flow of fluid in accordance with another embodiment of the present invention.

FIG. 10 is a blow-up diagram of a portion of the FCS 200 of FIG. 9 interacting with a flow of fluid in accordance with another embodiment of the present invention. The tips 220 of the plates 202 are exposed to a locally varying pressure gradient, changing from favorable upstream to adverse downstream. In a manner similar to the previous embodiment, the tips 220 will experience flow-induced oscillations, since the flow pressure gradient exactly over it will be zero. The flow 208 will separate downstream of the tips 220 entrapping a small vortex 222. Due to the damping provided by the compliant layers 204, most of the turbulent kinetic energy imparted to the plates 202 will be dissipated. However, in a manner similar to the previous embodiment, flow-induced oscillations around the frequency f≈U/s (U=the local freestream velocity of the flow 208, and s=streamwise spacing of the plate tips 220) will be allowed to pass. This will control the entrainment in a shear layer 224.

In the ideal case, the vortex 222 should extend just up to the tip 220 of the plate 202 immediately downstream. A larger vortex 222 will cause full-blown flow separation with an accompanying large increase in form or pressure drag. Whereas, a small vortex 222, due to excessive entrainment in the shear layer 224, will increase the skin friction drag. A reduction in skin friction occurs due to the reversed flow next to the surface of the plates 202 caused by the vortex 222. The choice of the compliant porous elastomeric layer has to be such that its damping increases significantly for oscillation frequencies greater than 2f.

Figure 11:
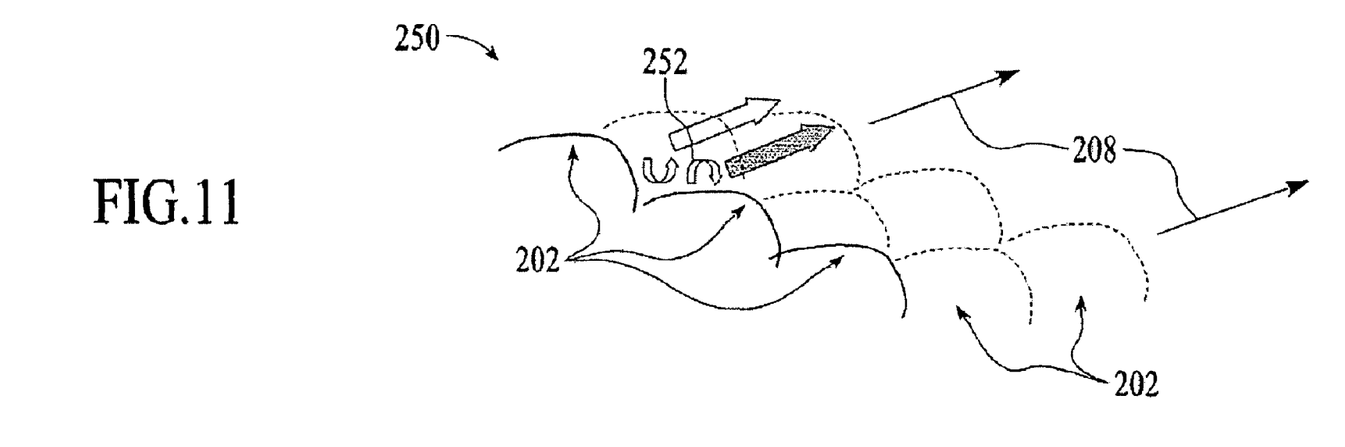
FIG. 11 is a diagram an FCS interacting with a flow of fluid in accordance with another embodiment of the present invention.

FIG. 11 is a diagram of an FCS 250 interacting with a flow of fluid in accordance with another embodiment of the present invention. In this specific embodiment, the plates 202 have a curved profile giving and form a fish-scale pattern. As such, counter-rotating longitudinal vortices 252 can be generated that can assist in drawing the shear layer closer to the surface of the plates 202 by enhancing mixing.

Figure 12:
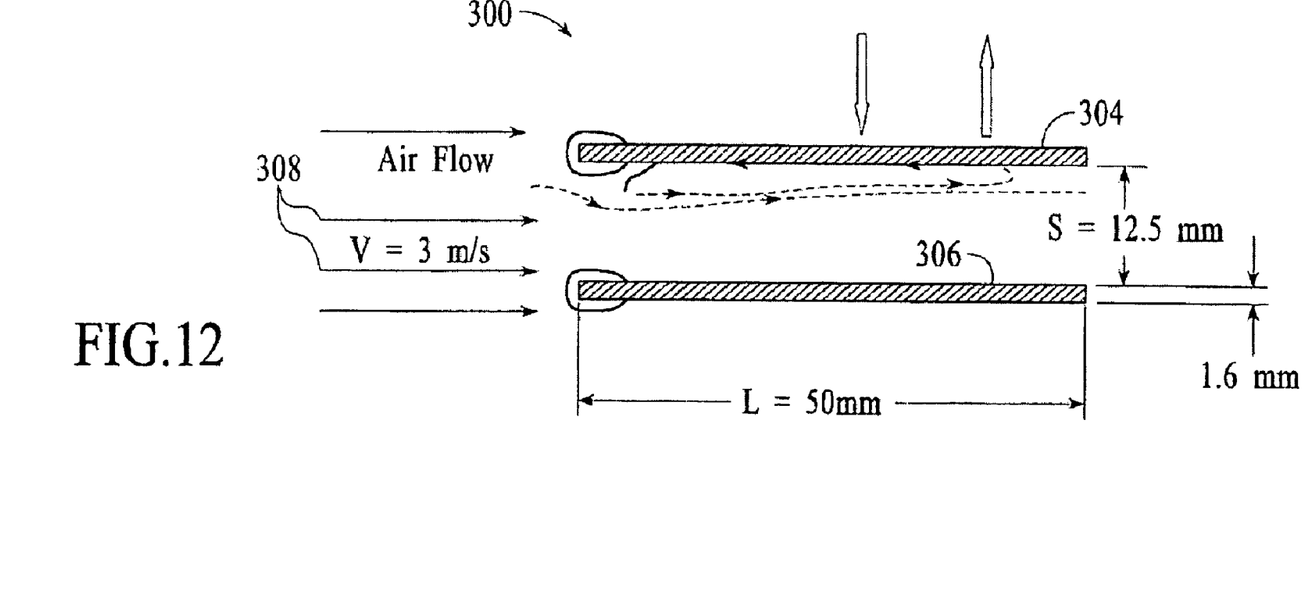
FIG. 12 is a diagram of a heat transfer enhancement test apparatus in accordance with another embodiment of the present invention.

FIG. 12 is a diagram of a heat transfer enhancement test apparatus 300 in accordance with another embodiment of the present invention. The heat transfer enhancement test apparatus 300 includes an FCS 302, which is wrapped around the leading edges of heat exchanger fins 304 and 306. In this specific embodiment, the heat exchanger fins 304 and 306 are 250 mm wide.

A 3-m/s approach velocity of ambient atmospheric air 308 through a 12.5-mm wide fin passage was used while the upper heat exchanger fin 304 was heated or cooled. The heat transfer coefficients were deduced from direct measurement of fin surface heat flux and air temperatures. The passage pressure drop is between the ambient air and exit of the passage. Application of the FCS 302 was seen to reduce the pressure drop by about 32% while increasing fin surface heat transfer coefficients between 43% and 127%. The FCS 302 achieves this by destroying the similarity of temperature and velocity profiles (i.e., Reynolds analogy) through the sustenance of a thin vortex 310, through turbulence spectrum modification, near the fin surface. Heat flows easily across this vortex, which also allows the main flow through the passage to proceed unabated as compared to the clean fin surface. The following illustrates heat transfer characteristics with and without the FCS 302.

| CLEAN FINS (No FCS) | FINS WITH FCS |
| --- | --- |
| Pressure Drop along 50-mm passage: ($\Delta P$) = 16.0 ± 0.1 Pa | ($\Delta P$) = 10.9 ± 0.1 Pa |
| Average Heat Transfer Coeft (Top Heated): h = 38.7 ± 1.2 W/m2-K | h = 55.5 ± 1.7 W/m2-K |
| Average HeatTransfer Coeft (Top Cooled): h = 18.5 ± 4.0 W/m2-K | h = 42.0 ± 5.5 W/m2-K |

Figure 13:
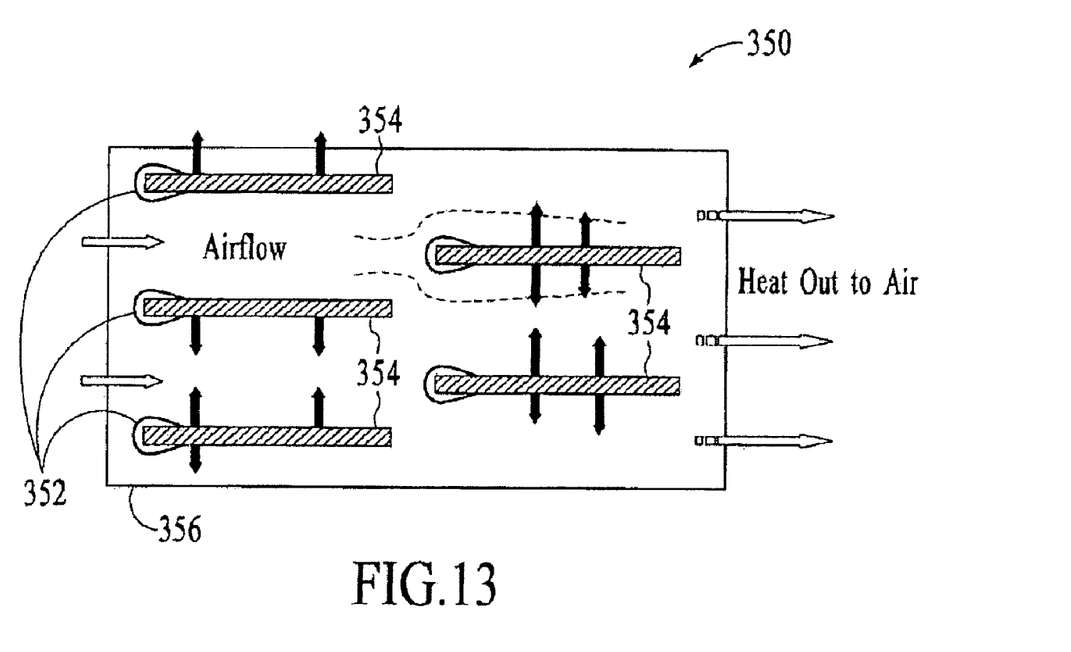
FIG. 13 is a top-view diagram of a multi-fin heat sink in accordance with another embodiment of the present invention.

FIG. 13 is a top-view diagram of a multi-fin heat sink 350 in accordance with another embodiment of the present invention. The multi-fin heat sink 350 includes an FCS 352, which is wrapped around heat exchanger fins 354. The heat exchanger fins 354 are coupled to a base 356. In operation, heat transfer from the fins to a fluid, or vice-versa, is enhanced, while reducing the fin-passage pressure drop in the fluid.

Figure 14:
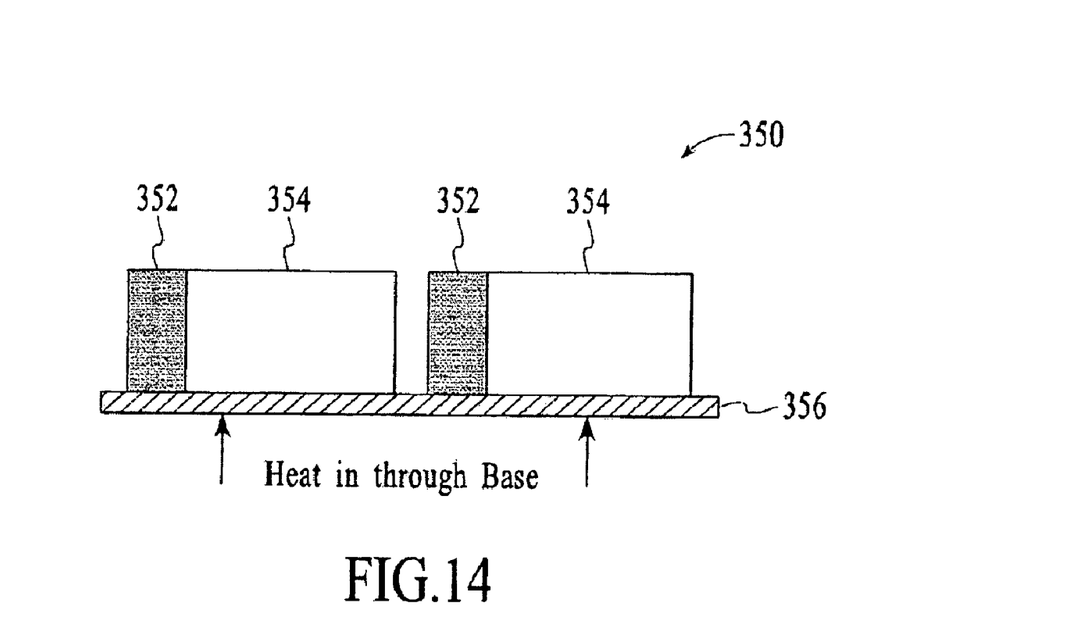
FIG. 14 is a side-view diagram of the multi-fin heat sink of FIG. 13.

FIG. 14 is a side-view diagram of the multi-fin heat sink 350 of FIG. 13. The FCS-enhanced fins 354 can be configured into a multi-fin heat exchanger in a variety of ways. For example, the fins can be staggered as shown in FIG. 13. The fins 354 can form a plurality of flow passages. The flow passages can be parallel. The principal flow through the flow passages can also have a component parallel to the local gravitational field thereby creating a compact natural convection surface. In another embodiment, the FCS can be coupled to fins on a heat pipe, fins on a tube carrying a hot or cold heat transfer fluid, or to the leading edge of one or more blades of a fan.

According to the system and method disclosed herein, the present invention provides numerous benefits. For example, it can enhance heat transfer in a variety of applications while minimizing or lowering the drop in flow pressure, or reduce aircraft wing drag or make fans more efficient and quiet.

Although the present invention has been described in accordance with the embodiments shown, one of ordinary skill in the art will readily recognize that there could be variations to the embodiments and those variations would be within the spirit and scope of the present invention. For example, any of the embodiments shown could be used in a variety of applications and its use would be within the spirit and scope of the present invention. Accordingly, many modifications may be made by one of ordinary skill in the art without departing from the spirit and scope of the appended claims.

REFERENCES

1. Carpenter, P. W., Lucey, A. D. and Davies, C., "Progress on the Use of Compliant Walls for Laminar Flow Control," *J. of Aircraft*, Vol. 38, No. 3, 2001, pp. 504-512.
2. Kays, W. M. and London, A. L. "COMPACT HEAT EXHANGERS-3$^{rd}$. Edition," McGraw Hill, New York, 1984.
3. Sinha, S. K., Wang, H., and Zou, J., "Interaction of an Active Flexible Wall with separating Boundary Layers," AIAA Paper 99-3594, June-July 1999.
4. Sinha, S. K., "Flow Separation Control with Microflexural Wall Vibrations," *Journal of Aircraft*, Special Issue on Flow Control (Vol. 38, No. 3., May-June-2001) pp. 496-503.
5. Sinha, S. K., and Zou, J., "On Controlling Flows with Micro-Vibratory Wall Motion," AIAA paper AIAA-2000-4413, August 2000.
6. Sinha, S. K., "System for Efficient Control of Separation using a Driven Flexible Wall," U.S. Pat. No. 5,961,080, awarded Oct. 5, 1999.

What is claimed is:

1. A method of reducing velocity and pressure fluctuations in a non-zero pressure gradient boundary layer flow using a flexible composite sheet, the flexible sheet comprising a membrane; a substrate supporting said membrane; a plurality of equispaced ridges with two distinct heights coupled to the substrate between said membrane and said substrate; and a gas enclosed in the space between the substrate and the membrane such that modes of flexural oscillation of said membrane which force said gas over the shorter of said ridges experience higher viscous damping compared to other modes the method comprises the steps of:

exposing the membrane to a region in a flow of fluid where the streamwise flow pressure gradient changes from favorable to adverse thereby imparting vibratory motion from the flow to a least one segment of a membrane spanning a distance(s) over two of the said ridges, wherein a favorable pressure gradient aids the flow and an adverse pressure gradient opposes the flow; wherein the vibratory motion is reflected from the at least one segment of the membrane to the flow, and; wherein a reduction in fluctuations is caused in the flow pressure gradient and freestream velocity U at all frequencies except where the frequency is approximately equal to ≈U/s.

2. The method of claim 1 wherein the exposing step comprising wrapping flexible composite sheet around a leading edge of a plate that is aligned with an incoming flow of fluid such that velocity and pressure fluctuations in the flow can be attenuated so as to create a separated flow region on the surface of the plate downstream of the flexible composite sheet.

3. The method of claim 1 wherein the exposing step comprises affixing the flexible composite sheet to an aerodynamic surface where the flow pressure gradient changes from favorable to adverse such that velocity and pressure fluctuations in the flow can be attenuated so as to create an extended separated flow region on said aerodynamic surface in order to reduce aerodynamic drag and reduce the intensity of flow induced oscillatory forces.

4. The method of claim 3 wherein the aerodynamic surface is a portion of a wing, in order to reduce aerodynamic drag, increase wing lift to drag ratio, delay the onset of flow separation and stall and reduce the intensity of flow-induced oscillatory forces on the wing.

5. The flexible composition sheet of claim 1 wherein the fluid can be any of a gas, vapor, mixtures of gases and vapors or a liquid.

* * * * *